United States Patent [19]
Konno

[11] 3,978,289
[45] Aug. 31, 1976

[54] REMOTE-CONTROLLED AUTOMATIC TELEPHONE-ANSWERING AND MESSAGE-RECORDING APPARATUS

[75] Inventor: Akira Konno, Kawagoe, Japan

[73] Assignee: Pioneer Electronic Corporation, Tokyo, Japan

[22] Filed: Feb. 18, 1975

[21] Appl. No.: 550,673

[30] Foreign Application Priority Data
Feb. 16, 1974 Japan............................... 49-18799

[52] U.S. Cl. ............................................. 179/6 E
[51] Int. Cl.² ..................... H04M 1/64; H04M 11/10
[58] Field of Search ........................... 179/6 E, 6 R

[56] References Cited
UNITED STATES PATENTS

| | | | |
|---|---|---|---|
| 3,524,936 | 8/1970 | Hill..................................... | 179/6 E |
| 3,757,049 | 9/1973 | Bowsky et al. ...................... | 179/6 E |
| 3,843,842 | 10/1974 | Muller................................ | 179/6 E |
| 3,867,578 | 2/1975 | Uechi................................. | 179/6 E |

Primary Examiner—Vincent P. Canney
Attorney, Agent, or Firm—Sughrue, Rothwell, Mion, Zinn and Macpeak

[57] ABSTRACT

A first remote control signal transmitted by the owner of an automatic telephone-answering and message-recording apparatus is detected to rewind the message tape to a predetermined position. The tape is then driven forward to play back the recorded message over a telephone line to the owner. However, if the apparatus is in the message recording state when the control signal is transmitted, then the signal will also be recorded on the tape. A subsequent remote control signal transmitted during the play-back operation is not recorded, and is detected to operate a rewind mechanism to rewind the message tape an amount corresponding to the duration of the signal; the tape is again driven forward to again play back the tape. A control circuit is provided to prevent an unwanted additional operation of the rewinding mechanism when the recorded first control signal is played back through the apparatus.

6 Claims, 1 Drawing Figure

REMOTE-CONTROLLED AUTOMATIC TELEPHONE-ANSWERING AND MESSAGE-RECORDING APPARATUS

BACKGROUND OF THE INVENTION

1. Field of the Invention

This invention relates to an automatic telephone-answering and message-recording apparatus which sends out previously recorded answer messages (outgoing messages) before recording the messages (incoming messages) left by a calling party, and, more particularly, to such an apparatus which can repeatedly reproduce an already recorded calling party's message in response to remote control signals transmitted through telephone lines to the apparatus.

2. Description of the Prior Art

Telephone-answering and message recording apparatus of the type having a remote control function can be classified into the following two categories:
 1. an apparatus with a message recording tape on which the remote control signal is recorded; and
 2. an apparatus provided with a contact-mounted tape counter so constructed as to be reset in response to the received remote control signal.

In the former apparatus, the incoming remote control signal is recorded on the incoming message-recording tape as well as being detected to set the tape in its reproducing condition and to rewind the tape to a predetermined start position. The tape is then played back to reproduce an already recorded calling party's message. This playing-back operation continues until the recorded remote control signal is reproduced, at which time the playback operation is stopped.

In the latter apparatus, the tape counter is reset when the message recording tape is rewound. The tape is then played back. The distance of the tape travel is measured by the counter, and the counter continues its operation until the tape is played back to its original starting point, at which time the apparatus is released to terminate the playback operation.

Those apparatuses mentioned above, however, cannot function to rewind the message recording tape to a requested position in response to a remote control signal which arrives during a playback operation. The reason for this deficiency is that the incoming message-recording tape will be rewound upon every detection of the reproduced remote control signal if the above-mentioned new rewind function during reproduction is applied to a prior art apparatus as it is, since such an apparatus is designed so as to detect the first remote control signal in the incoming message recording state.

U.S. Pat. No. 3,649,762 discloses a prior art automatic telephone-answering and message-recording apparatus of the type to which this invention applied, and U.S. Pat. No. 3,730,997 discloses this type of apparatus including a prior art means for playing back a calling party's recorded message in response to a remote control signal.

SUMMARY OF THE INVENTION

According to a feature of the present invention, the automatic telephone-answering and message-recording apparatus can reproduce the message on a requested tape portion, because the tape can be rewound again to a requested position in response to a remote control signal arriving in the midst of playback operation which was initiated by a previous remote control signal.

DETAILED DESCRIPTION OF THE PREFERRED EMBODIMENT

Figure 1:
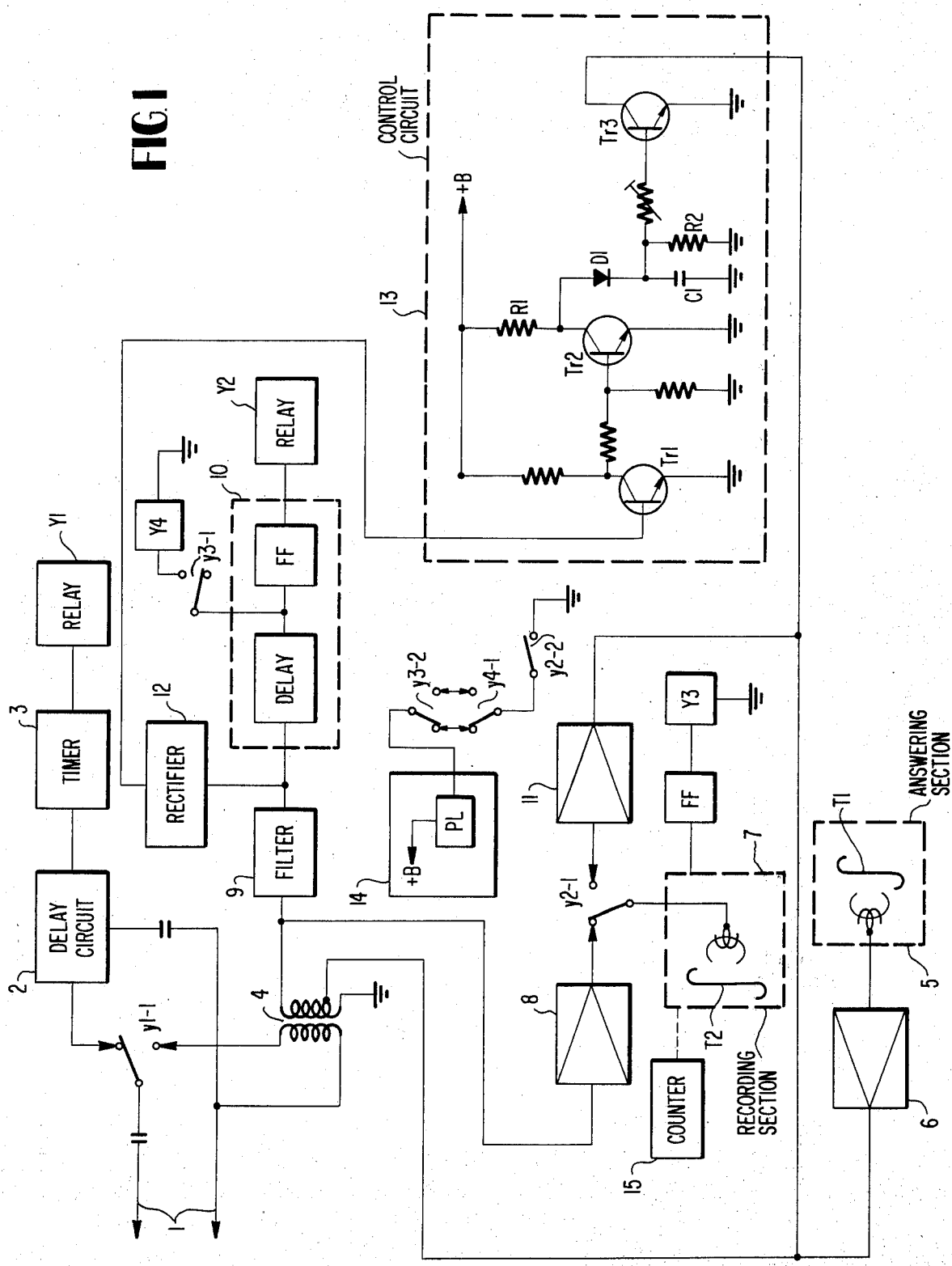
FIG. 1 is a combined block and schematic circuit diagram of an automatic telephone-answering and message-recording apparatus embodying the present invention.

In the apparatus of the drawing, a calling signal arriving at the apparatus through telephone lines 1 is applied through the contact $yy1$-1 the unactuated relay Y1 (whose operation will be described later) to a delay circuit 2, and after a short time delay the signal actuates a timer 3 and relay Y1 to switch contact $y1$-1 to its lower terminal. Relay Y1 is kept in this actuated or operating condition for a period determined by timer 3. During that period contact $y1$-1 remains connected to the matching transformer 4, and therefore, telephone lines 1 are held on for communication.

When the communication loop is so established, the answer section 5, controlled by switching of a contact (not shown) of the relay Y1, starts to reproduce the answer message previously recorded on its answer tape T1. This message is transmitted through amplifier 6 and transformer 4 to telephone lines 1. After transmitting all of the answer message, answer section 5 stops its operation. In succession, the recording section 7 then starts to operate so that it receives the calling party's incoming message from telephone lines 1 through contact $y1$-1, transformer 4, recording amplifier 8, and contact $y2$-1 of the unactuated relay Y2 (whose operation is described later), whereby the message is recorded on the incoming message recording tape T2.

When the predetermined period of timer 3 comes to the end, relay Y1 is released and returns to its original unactuated state. At that time, contact $y1$-1 returns to the upper terminal connected to delay circuit 2, and hence, the apparatus is returned to its original reset state. This operation is repeated whenever a new calling signal arrives. In this way, messages are recorded one after another on recording tape T2.

The automatic telephone-answering and message-recording apparatus described immediately above is well-known and conventional. Now, if a first remote control signal (e.g., a sound signal of 800 Hz generated by an oscillator carried by the owner of this apparatus) is received over the telephone lines after answer section 5 has finished its operation but while recording section 7 is still operating to record an incoming message, the remote control signal selected by a filter 9 passes through a confirming circuit 10 comprising a delay circuit and a flip-flop circuit and actuates relay Y2, and is also recorded on tape T2 through amplifier 8 and contact $y2$-1. The actuation of relay Y2 switches its contact $y2$-1 into engagement with the terminal connected to the reproducer amplifier 11. Furthermore, the recording tape T2 in recording section 7 is rewound to a predetermined position by a plunger PL of a suitable rewind mechanism 14 in response to the switching of contact $y2$-2 of relay Y2. The tape is driven forward to reproduce or play back the already recorded message on tape T2 because plunger PL is released from actuated state when tape T2 is rewound up to the predetermined position and thereby a relay Y3 is actuated through a flip-flop circuit. The reproduced message is transmitted through contact $y2$-1, amplifier 11, transformer 4, and contact $y1$-1 to telephone lines 1. This remote control operation is also conventional.

However, according to this invention, if the already reproduced portion of tape T2 is required to be played back again while the message is being reproduced, a subsequent remote control signal is transmitted for a given time duration. The remote control signal, after passing through the filter 9, actuates a relay Y4, which controls plunger PL, through delay circuit and contact y3-1. Therefore, tape T2 is rewound for a time period nearly equal to the time duration of the subsequent control signal, and then it is played back again. Thus, a desired portion of the message recorded on tape T2 can be reproduced as many times as requested, and it should be noted that such subsequent remote control signals are not recorded on tape T2. However, when the playback operation proceeds to the tape position where the first remote control signal was received and recorded on tape T2, this position is detected by a suitable means, such as the tape counter 15 with a contact which is shown in U.S. Pat. No. 3,627,228, to stop the apparatus and place it in the reset state.

Because recording section 7 is still in the recording mode when the first remote control signal is received, the first remote control signal is recorded on tape T2 when the signal arrives at the section. This remote control signal is, therefore, reproduced during playback when tape T2 returns to its starting point from where it was rewound, and the reproduced remote control signal would normally be transmitted through amplifier 11, a winding of transformer 4, and through filter circuit 9. Therefore, rewind mechanism 14 might be operated to again rewind tape T2, if it were not for the fact that this reproduced remote control signal is also fed through a rectifier circuit 12 to a control circuit 13.

Control circuit 13 comprises a normally OFF transistor Tr1, which is turned ON by an output from rectifier circuit 12, and a normally ON transistor Tr2 is turned OFF whenever transistor Tr1 is ON. Transistor Tr2 in its OFF state has a high collector voltage and hence permits a current to flow from B + through resistance R1 and diode D1 into a capacitor C1 to charge the capacitor. After a time lapse determined by the time constant R1C1 formed by capacitance C1 and resistance R1, the normally OFF transistor Tr3 turns ON. The output derived from the collector of transistor Tr3, reduces to zero or attenuates the output of amplifier 11. The null or attenuated output of amplifier 11 returns transistor Tr1 to the OFF state. It should be remembered that the output of amplifier 11 is the reproduced remote control signal first recorded on tape T2. Now transistor Tr2 turns ON so that capacitor C1 is discharged through resistance R2. Discharge of capacitor C1 turns OFF transistor Tr3 and permits amplifier 11 to produce an output which again turns ON transistor Tr1. Thus, the output of amplifier 11 is cyclically interrupted with a time constant determined by capacitor C1, resistance R1 and resistance R2. Such an interrupted signal will not actuate the rewinding mechanism 14. Therefore, the playing back operation of tape T2 continues until the start point of the first rewinding operation is detected by the counter 15, for example, and then the apparatus is released. In addition, the output of control circuit 13 may be applied to the output terminal of recording amplifier 8 instead of that of reproducer amplifier 11. Since the remote control signal taken out of the reproducer amplifier 11, in that case also, will be interrupted, the apparatus can repeatedly reproduce the requested portion of message tape T2 in same manner as mentioned above.

A suitable switching or sensing circuit may be provided to detect the interrupted signal, in which case the tape counter will be unnecessary for detecting when tape T2 reaches its original winding point during playback.

As described above, the apparatus of the present invention can repeatedly reproduce the requested portion of the message tape T2 in response to a remote control signal received during a playback operation initiated by a previous remote control signal. Therefore, one can assure the complete recorded message is understood without losing the time necessary to rewind the tape to the beginning of the message.

While the invention has been described in detail and with reference to specific embodiments thereof, it will be apparent to one skilled in the art that various changes and modifications can be made therein without departing from the spirit and scope thereof.

I claim:

1. In a remote-controlled automatic telephone-answering and message-recording apparatus connected to a telephone line and of the type including a recording circuit for recording incoming messages on a message tape which can be rewound to a predetermined position and reproduced and played back during a playback cycle through a playback circuit in response to a first remote control signal transmitted over the telephone line, and wherein the first remote control signal is recorded on the message tape when the signal is transmitted while an incoming message is being recorded on the message tape during a recording cycle, the improvement comprising:

rewind means coupled to the telephone line and operative in response to a subsequent remote control signal transmitted, during the playback cycle initiated by the first control signal, over the telephone line to rewind the message tape, said subsequent control signal having the same frequency as said first control signal, and control circuit means coupled to the recording or playback circuit for preventing operation of said rewind means when the first remote control signal is reproduced.

2. The improvement defined in claim 1 wherein said rewind means is operative to rewind the message tape a distance corresponding to the time duration of said subsequent remote control signal.

3. The improvement defined in claim 2 wherein said playback circuit includes a playback amplifier whose output terminal is coupled to said telephone line; and wherein said control circuit means is coupled to said playback amplifier and comprises interrupting means for cyclically interrupting the reproduced control signal at the output of said amplifier at such a rate that said rewind means is not operated by the interrupted signal.

4. The improvement defined in claim 3 wherein said interrupting means comprises an RC timing circuit coupled between said telephone line and said playback amplifier for cyclically attenuating the gain of said amplifier to produce said interrupted signal.

5. The improvement defined in claim 2 wherein said recording circuit includes a recording amplifier whose input terminal is coupled to said telephone line; and wherein said control circuit means is coupled to said recording amplifier and comprises interrupting means for cyclically interrupting the control signal to be recorded at the output of said recording amplifier at such a rate that rewind means is not operated by the reproduced interrupted signal.

6. The improvement defined in claim 5 wherein said interrupting means comprises an RC timing circuit coupled between said telephone line and said recording amplifier for cyclically attenuating the gain of said recording amplifier to produce said interrupted signal.

* * * * *